(12) United States Patent
Morreale

(10) Patent No.: US 8,171,958 B2
(45) Date of Patent: May 8, 2012

(54) INTEGRATED PLUG/CHOKE VALVE

(75) Inventor: John D. Morreale, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 901 days.

(21) Appl. No.: 11/832,452

(22) Filed: Aug. 1, 2007

(65) Prior Publication Data

US 2009/0032764 A1 Feb. 5, 2009

(51) Int. Cl.
*F16K 3/26* (2006.01)
(52) U.S. Cl. ......... 137/625.39; 137/614.16; 137/625.32; 137/637.4
(58) Field of Classification Search .................. 137/613, 137/637, 637.2, 637.3, 637.4, 625.37, 625.38, 137/625.33, 625.28, 614.16–614.18, 625.31, 137/625, 32, 625.35, 625.39
See application file for complete search history.

(56) References Cited

U.S. PATENT DOCUMENTS

| | | | | |
|---|---|---|---|---|
| 239,718 A | * | 4/1881 | Burnett | 137/637.4 |
| 321,913 A | * | 7/1885 | Prusmann | 137/637.4 |
| 1,097,433 A | * | 5/1914 | Hill | 137/637.4 |
| 1,479,802 A | * | 1/1924 | Glendenning | 137/614.16 |
| 2,010,194 A | * | 8/1935 | McNeelan et al. | 137/637.2 |
| 2,186,481 A | * | 1/1940 | Fleming | 137/315.25 |
| 2,582,370 A | * | 1/1952 | Albrecht | 137/613 |
| 2,599,063 A | * | 6/1952 | Miller | 137/637.3 |
| 2,847,031 A | * | 8/1958 | Brown, Jr. | 137/637.4 |
| 3,990,475 A | * | 11/1976 | Myers | 137/625.3 |
| 4,635,678 A | | 1/1987 | Peterman et al. | 137/551 |
| 4,971,099 A | | 11/1990 | Cyvas | 137/270 |
| 5,086,808 A | | 2/1992 | Pettus | 137/625.3 |
| 5,133,383 A | | 7/1992 | King | 137/625.3 |
| 5,431,188 A | | 7/1995 | Cove | 137/625.3 |
| 5,623,966 A | | 4/1997 | Rodger | 137/625.32 |
| 6,105,614 A | | 8/2000 | Bohaychuk et al. | 137/625.3 |
| 6,536,473 B2 | | 3/2003 | Bohaychuk | 137/625.37 |
| 6,655,658 B2 | | 12/2003 | Neal et al. | 251/309 |
| 6,772,783 B2 | | 8/2004 | Etheridge | 137/15.18 |
| 7,114,336 B2 | * | 10/2006 | Hommema | 137/625.28 |

* cited by examiner

*Primary Examiner* — Craig Schneider
*Assistant Examiner* — Craig J Price
(74) *Attorney, Agent, or Firm* — Williams, Morgan & Amerson, P.C.

(57) ABSTRACT

An adjustable valve is disclosed which includes a plug body having at least one flow path defined therein and a choke cage positioned proximate the plug body, the choke cage comprising a plurality of openings to permit a flow of a fluid therethrough, the choke cage adapted to be used to regulate the flow of fluid through the flow path in the plug body.

41 Claims, 14 Drawing Sheets

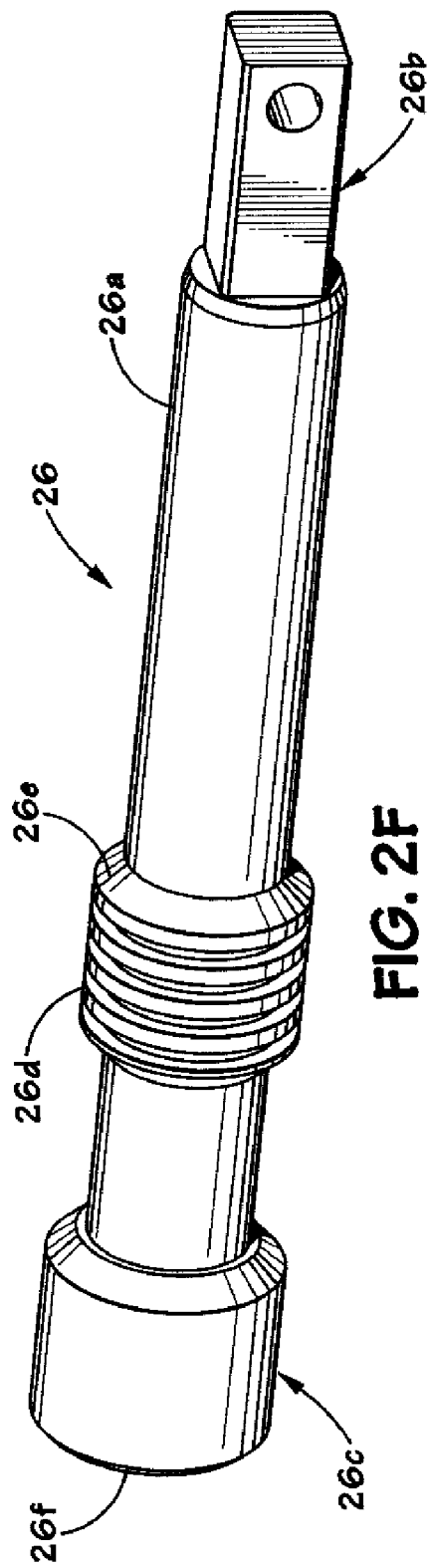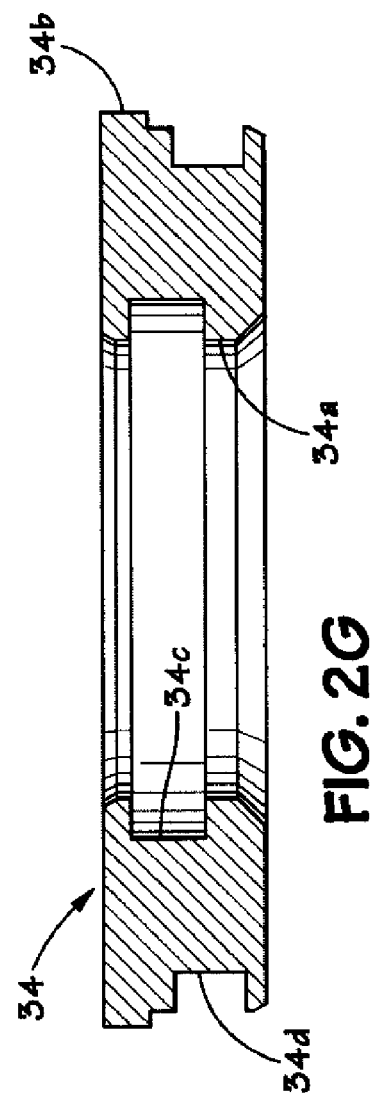

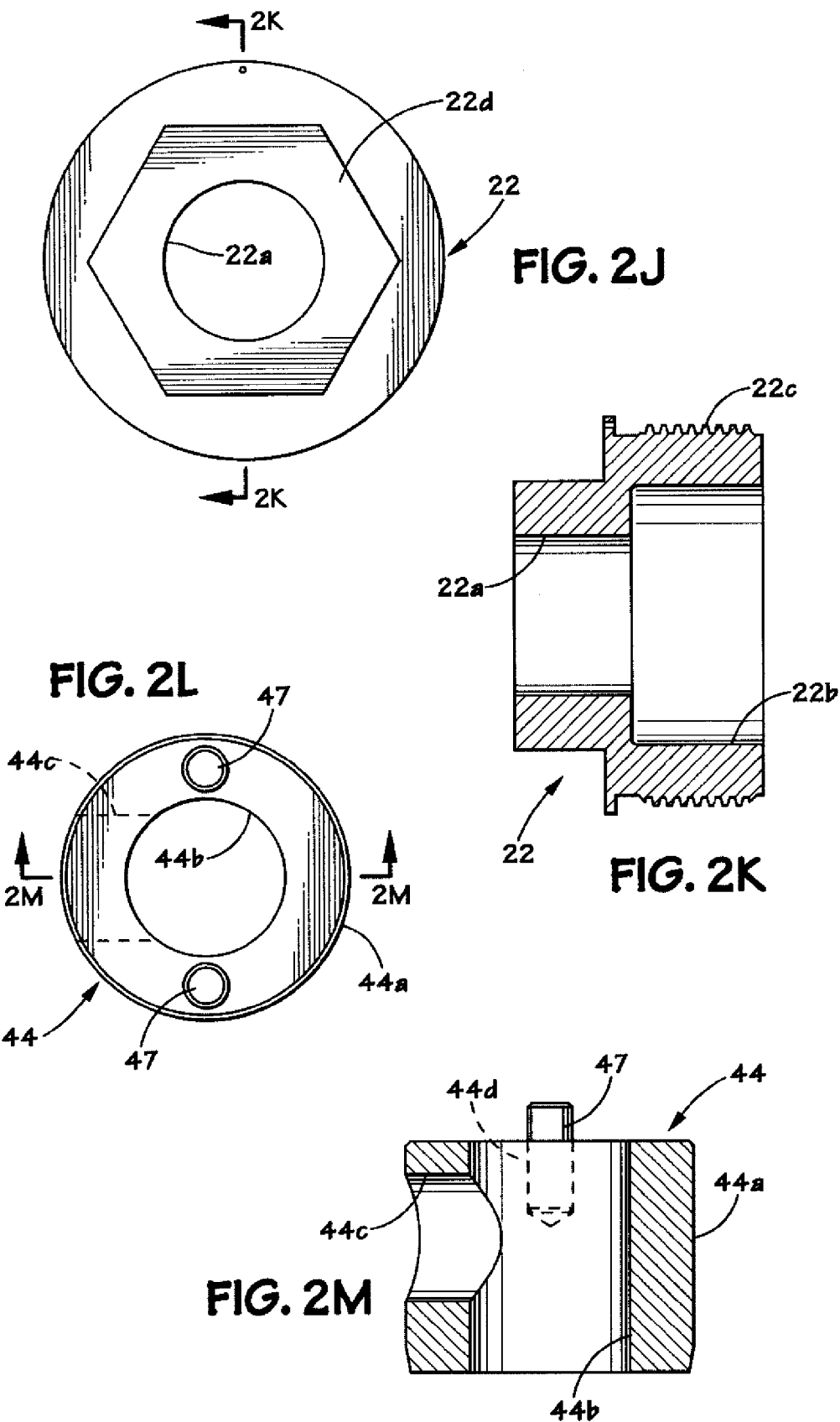

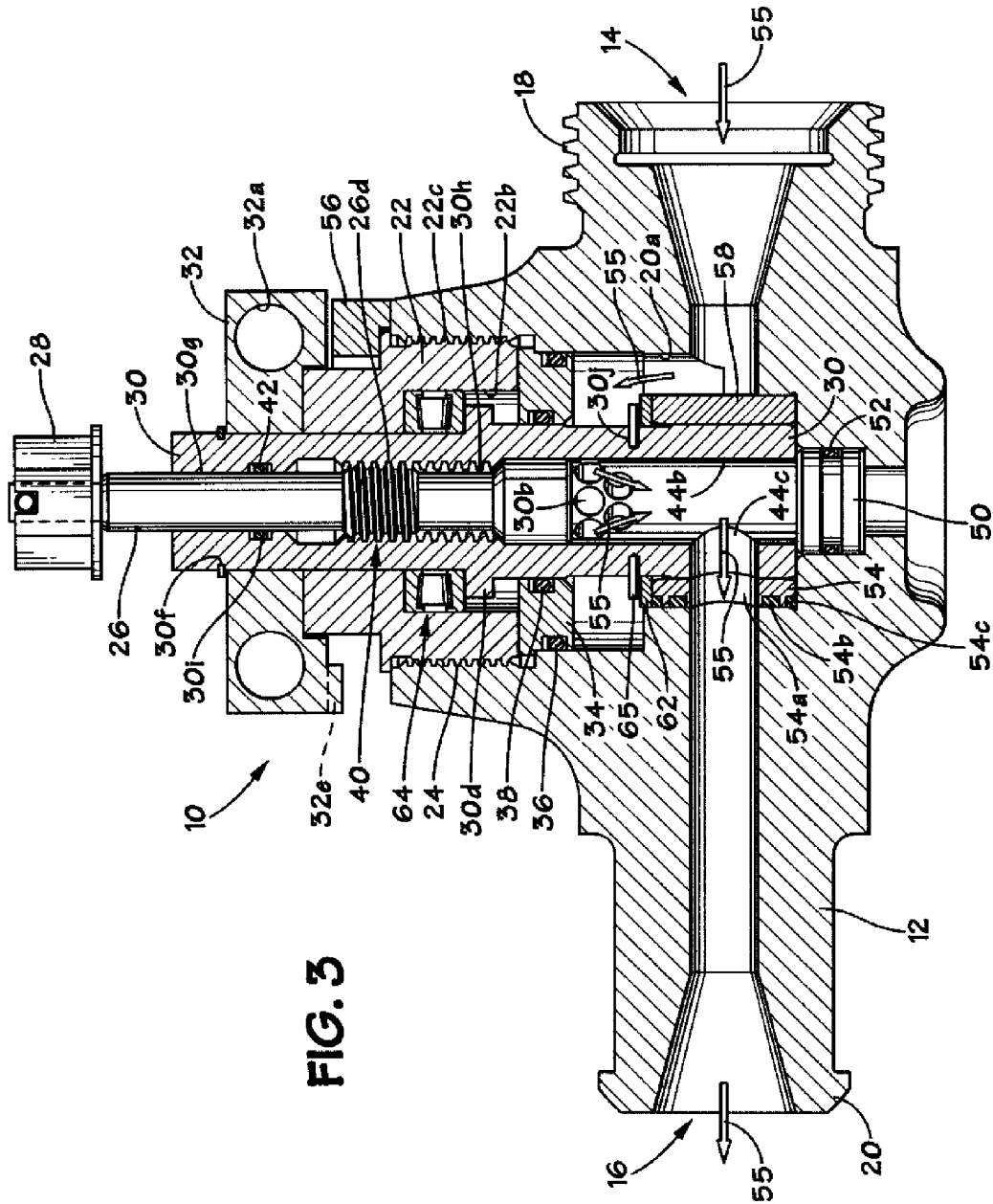

INTEGRATED PLUG/CHOKE VALVE

BACKGROUND OF THE INVENTION

1. Field of the Invention

The present invention is generally directed to the field of flow control devices, and, more specifically, to an integrated plug/choke valve.

2. Description of the Related Art

A choke valve is a throttling device used to reduce the fluid pressure or flow rate in a flow line. Hereinafter the device is referred to as a "choke." Chokes are commonly used in connection with well drilling and production operations for producing oil or gas, although they have other applications as well.

In many cases, the stream passing through the choke is very erosive. For example, a choke used in a drilling or production operation may be exposed to a high pressure gas stream moving at high velocity and carrying sand particles. In the course of undergoing pressure reduction in passing through the choke, the velocity of the flow stream is increased. This exacerbates the erosional effect of the flow stream. Choke failure due to erosion can lead to very serious problems in controlling well flow or, at a minimum, leads to costly repairs.

Plug valves are currently used to bleed flowlines. This is done by cracking the plug open and allowing high velocity erosive flow to travel through the partially open valve. This leads to the plug valve wearing out very quickly due to erosion of the body. Existing chokes do not achieve zero shut off in a way that can survive high speed erosive flow.

The present invention is directed to an apparatus for solving, or at least reducing the effects of, some or all of the aforementioned problems.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one illustrative embodiment, an adjustable valve is disclosed which comprises a plug body having at least one flow path defined therein and a choke cage positioned proximate the plug body, the choke cage comprising a plurality of openings to permit a flow of a fluid therethrough, the choke cage adapted to be used to regulate the flow of fluid through the flow path in the plug body.

In another illustrative embodiment, an adjustable valve is discloses which comprises a plug body having at least one flow path defined therein and a choke cage positioned proximate the plug body, the choke cage comprising a plurality of openings to permit a flow of a fluid therethrough, wherein the choke cage is operatively coupled to the plug body such that actuation of the choke cage controls an operational position of the plug body.

In yet another illustrative embodiment, an adjustable valve is disclosed which comprises a plug body having at least one flow path defined therein and a choke cage operatively coupled to the plug body such that actuation of the choke cage controls the operational position of the plug body.

In a further illustrative embodiment, an adjustable valve is disclosed which comprises a valve body, a plug body positioned within the valve body, the plug body having at least one flow path defined therein, and a choke positioned in the valve body, wherein the choke is adapted to regulate a flow of a fluid through the at least one flow path in the plug body.

In still a further illustrative embodiment, an adjustable valve is disclosed which comprises a rotatable plug body having at least one flow path defined therein, a rotatable choke cage operatively coupled to the rotatable plug body such that rotation of the choke cage causes rotation of the plug body and a rotatable member positioned within a portion of the choke cage, the rotatable member adapted to, when rotated, travel within the choke cage so as to cover or expose at least a portion of one of a plurality of openings in the choke cage to regulate a flow of fluid through the choke cage and the flow path in the plug body.

BRIEF DESCRIPTION OF THE DRAWINGS

The invention may be understood by reference to the following description taken in conjunction with the accompanying drawings, in which like reference numerals identify like elements, and in which:

FIG. 3 depicts an alternative embodiment of the valve disclosed herein wherein the choke cage and the plug are formed as a single unit.

Figure 1A:
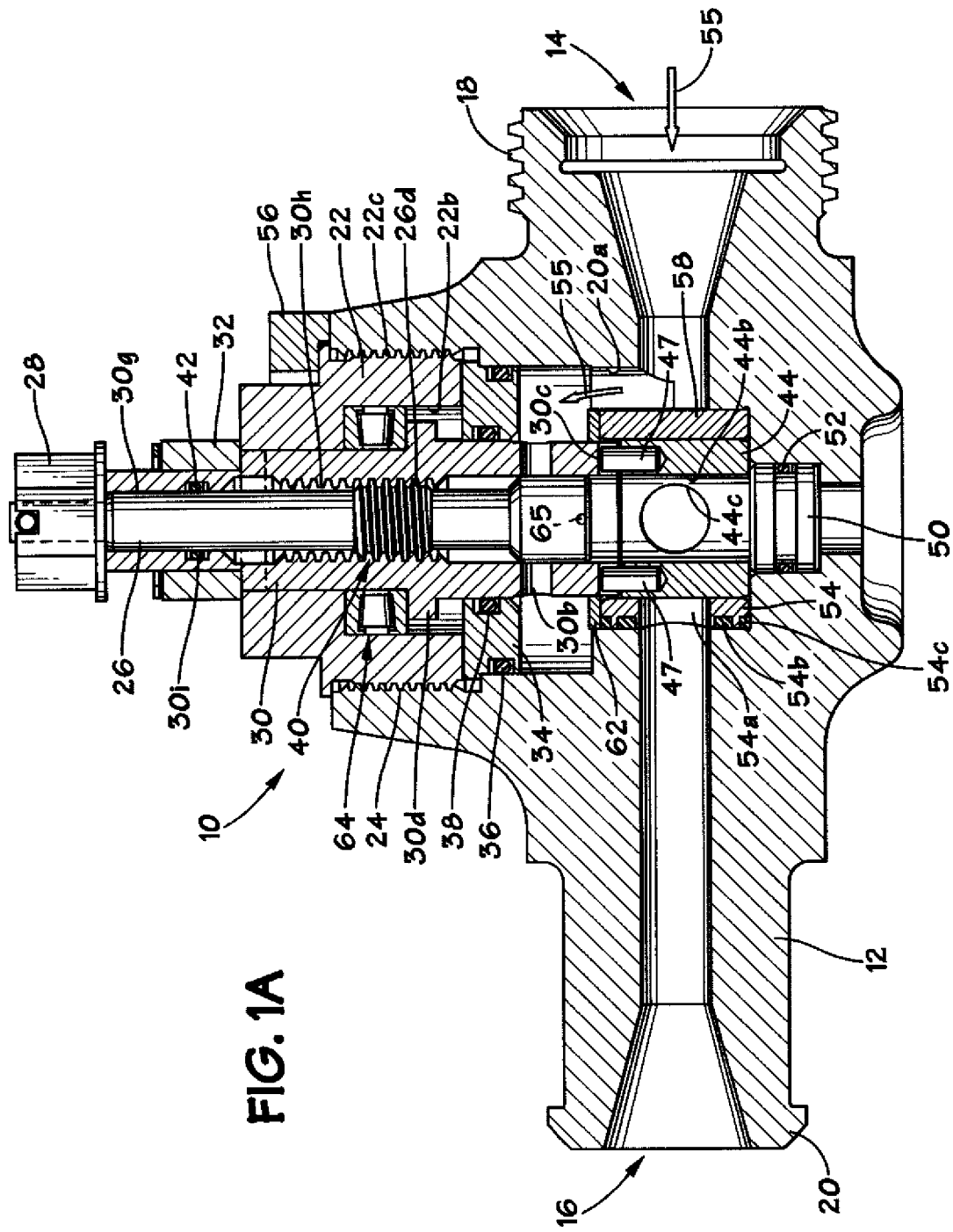
FIGS. 1A-1D are cross-sectional views depicting the valve disclosed herein in various operational states.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1B:
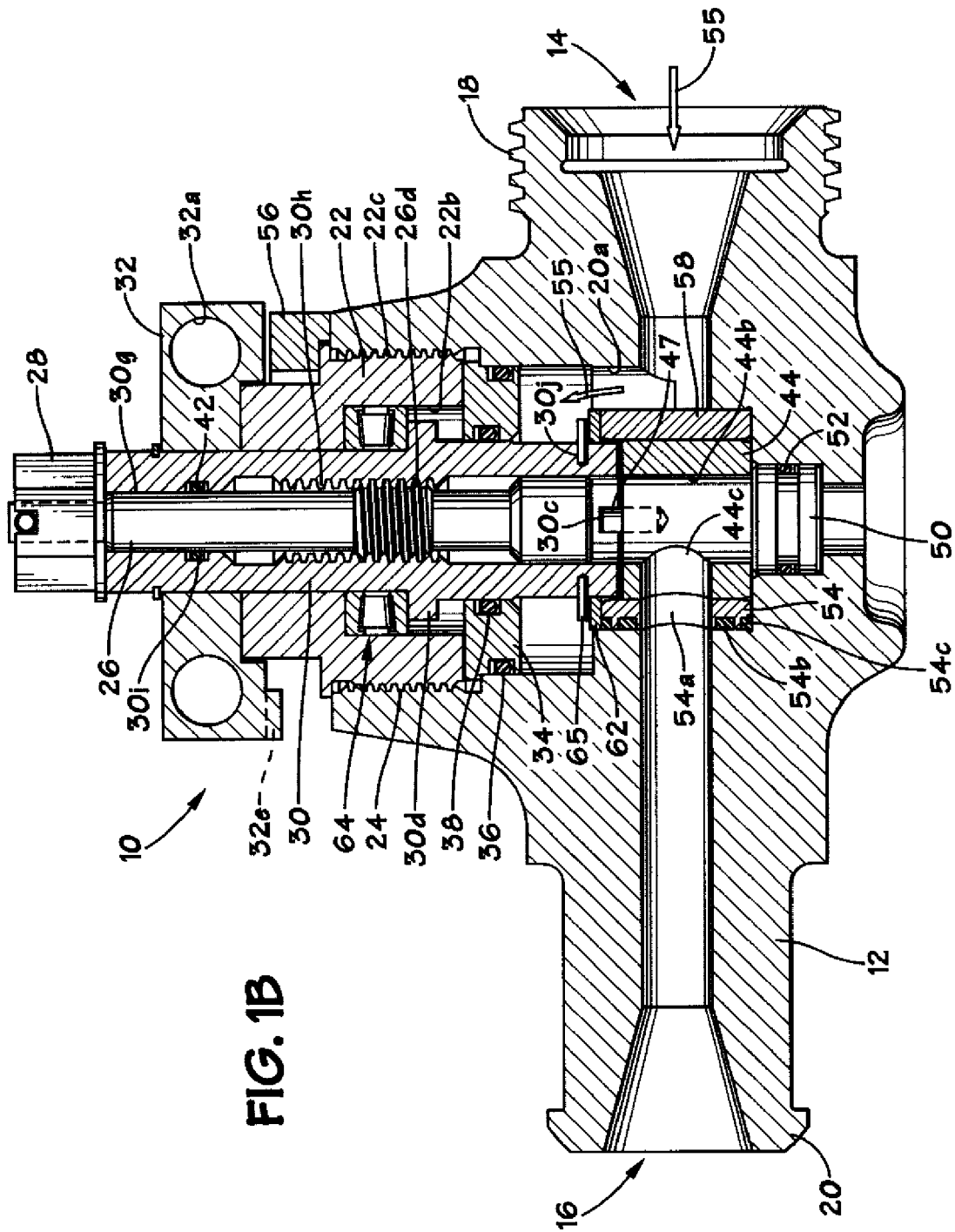
Figure 1C:
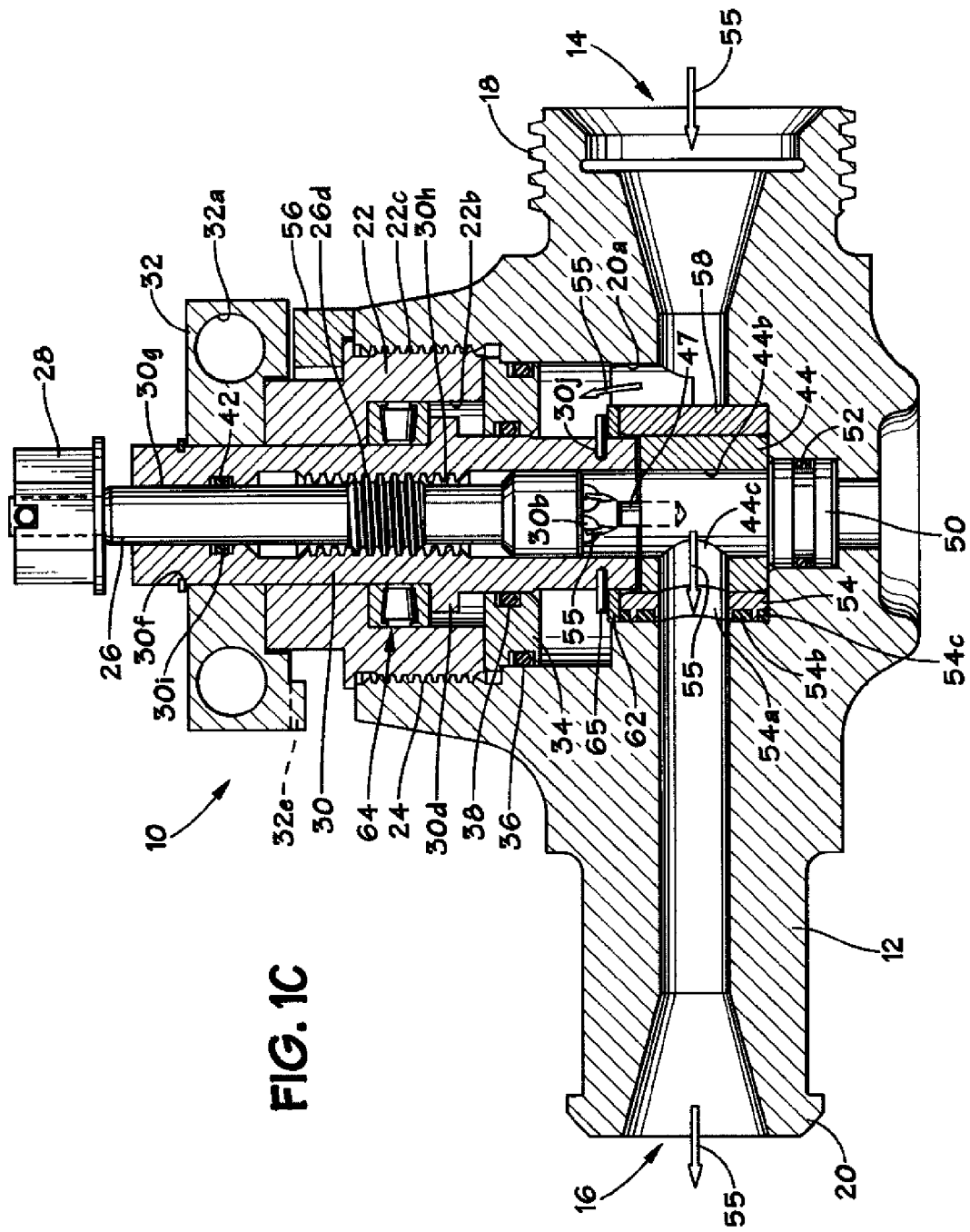
Figure 1D:
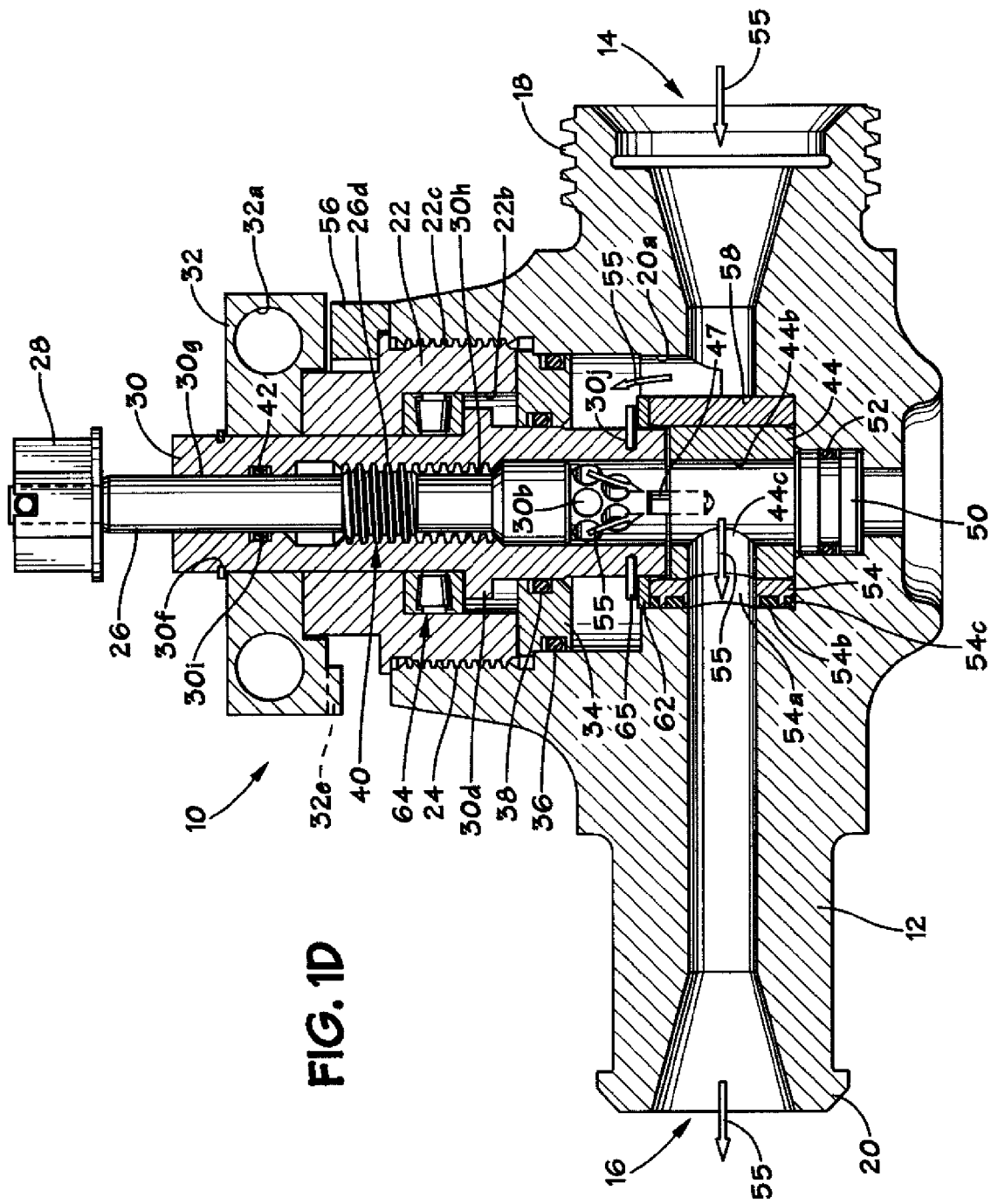
Figure 2A:
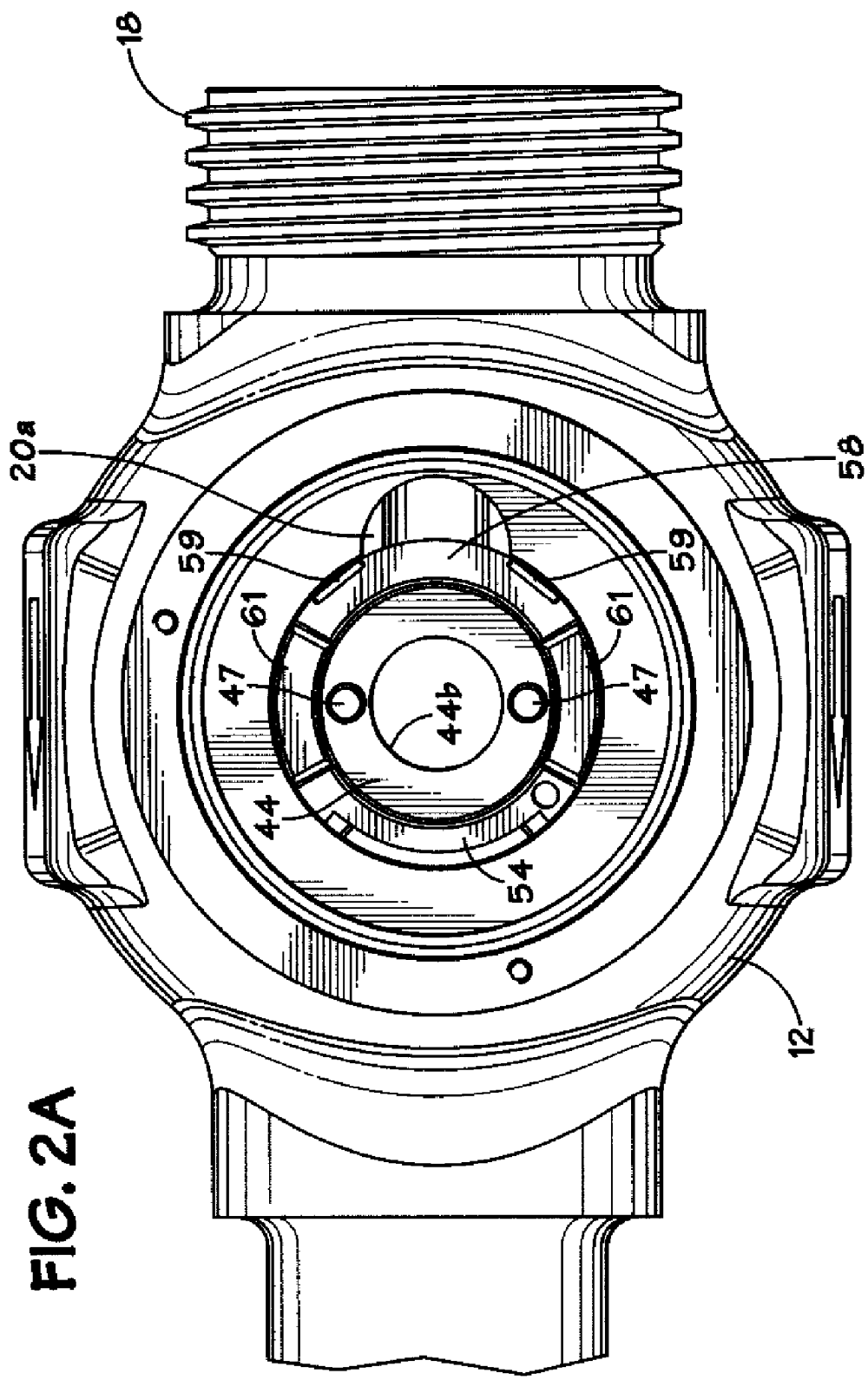
FIGS. 2A-2T are various views of various components of the illustrative valve disclosed herein.
Figure 2B:
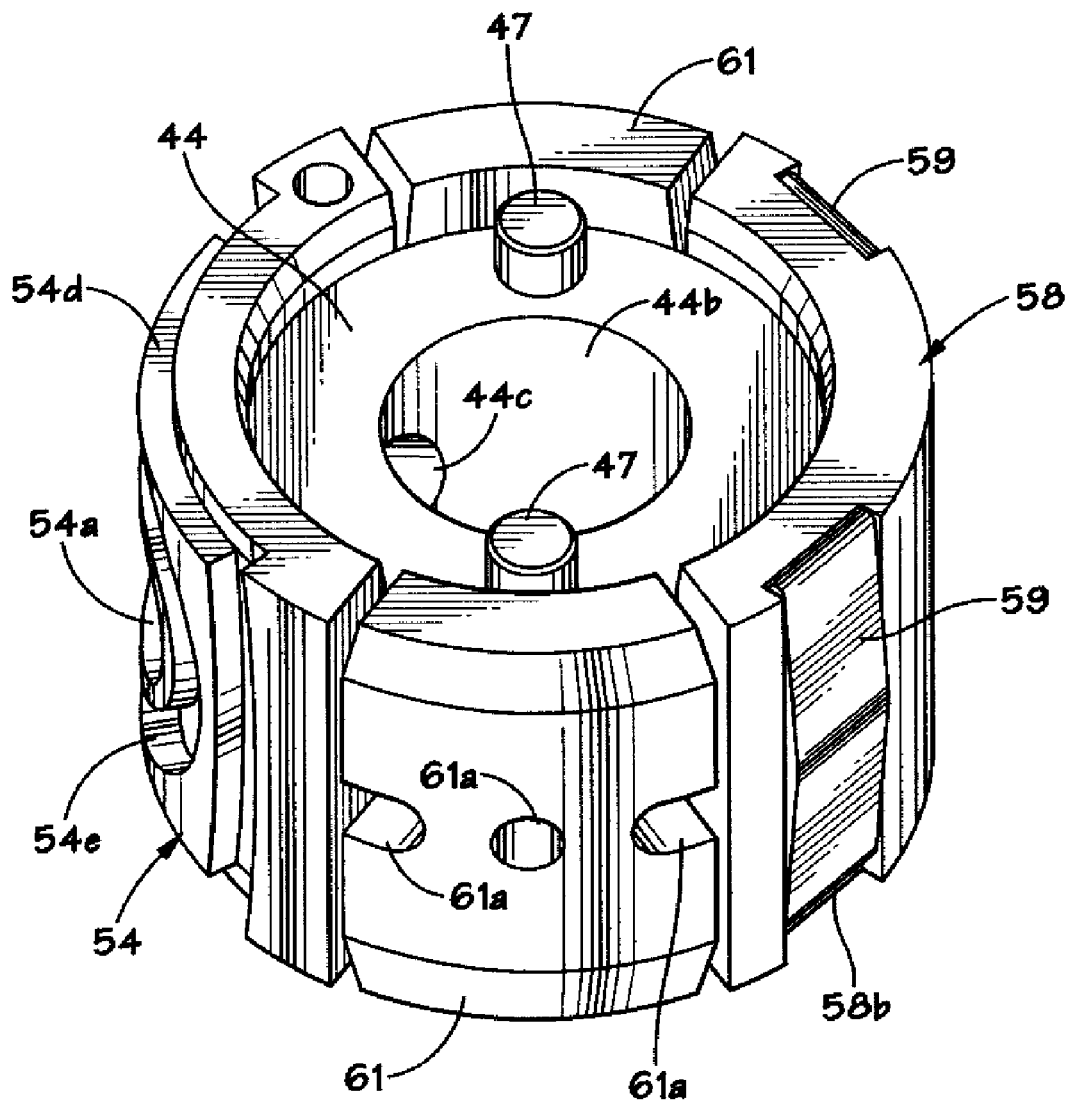

FIGS. 1A-1D depict the valve 10 disclosed herein in various operational conditions. In FIGS. 1A and 1D, the valve 10 is depicted in the fully closed and fully open operational position, respectively. FIGS. 1B and 1C depict the valve 10 in various intermediate operational positions. Various components of the valve 10 are depicted in FIGS. 2A-2N. Illustrative operational aspects of the valve 10 will be discussed more fully below after a discussion of the various components of the valve 10.

In the illustrative example depicted herein, the valve 10 comprises a body 12, an inlet 14, an outlet 16, an inlet connector 18, an outlet connector 20 and a body cap 22. The valve 10 further comprises a stopper 50, a plug 44, a choke cage 30, a stem 26, a stem nut 28, a cage adapter 34 and a choke control bar 32. The valve 10 also comprises a thrust bearing 64 is positioned within the annular recess generally defined by the outer diameter of the choke cage 30 and the diameter 22b of the body cap 22 and the upper surface of the flange 30d of the choke cage 30. The thrust bearing 64 may be of traditional construction. The valve 10 further comprises a seal segment 54, a seal segment 58 and a plurality of side elements (not shown in FIGS. 1A-1D). A washer 62 is positioned as shown and retained in that position by illustrative pins 65. A plurality of seals 36, 38, 42, 52, 54b and 54c are positioned adjacent various components of the valve 10. In general, when the valve 10 is opened, as shown in FIG. 1D, a fluid (gas or liquid), as depicted by the arrow 55, flows from the high pressure inlet 14 through a flow path 20a in the body 20, through the openings 30b in the choke cage 30, through the plug 44 and out the outlet 16.

FIG. 2A is a plan view of one illustrative embodiment of the body 12 disclosed herein with various components positioned therein. FIG. 2B is an enlarged perspective view of the illustrative plug 44 and various associated components. The size and configuration of the body 20, as well as its material of construction, may vary depending upon the particular application. In one illustrative embodiment, the components of the valve 10 may be comprised of high strength, heat treated steel. The internal components of the valve 10 may be comprised of various alloys, e.g., a high strength stainless steel, depending upon the particular application. As mentioned above, the internal flow path 20a (see FIG. 2A) is formed in the body 20. Of course, the flow path 20a may be of any desired size or configuration. Also depicted in FIG. 2A is the placement of various components within the body 20, i.e., the plug 44, the seal segment 54, the seal segment 58, the plurality of side segments 61 and a plurality of springs 59 positioned partially in the seal segment 58. The plug 44 further comprises a plurality of pins 47 positioned in holes formed in the plug 44. The seal segments 54 and 58 are typically comprised of a metal and segment 54 tends to form a metal-to-metal seal it engages the outer surface of the plug 44. The side segments 61 serve to occupy the space between the two segments 54, 58. The segments 61 may be made from a variety of materials, e.g., a plastic.

Figure 2C:
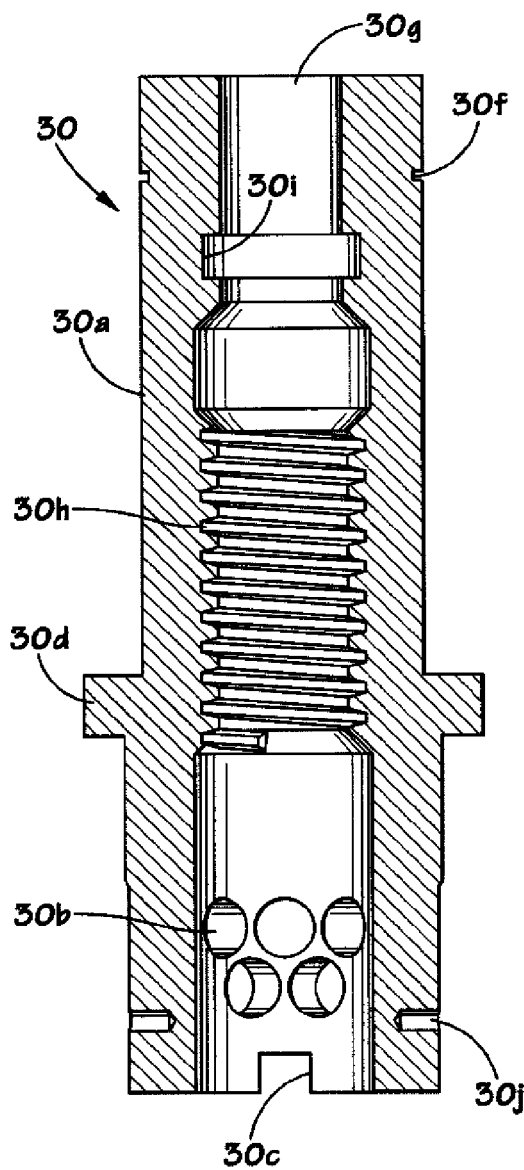
Figure 2D:
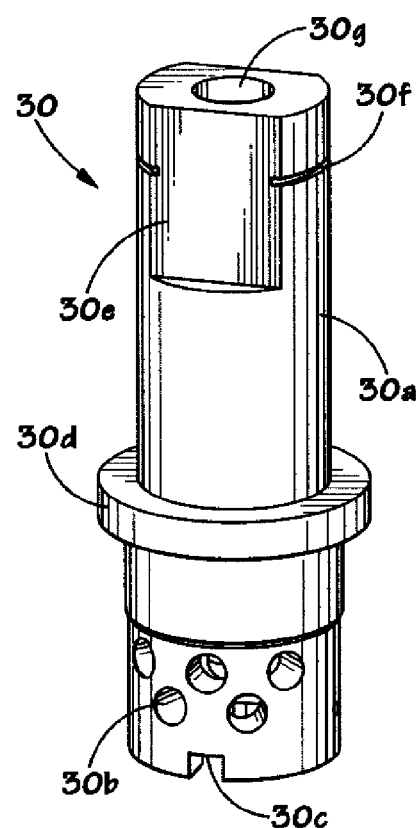
Figure 2E:
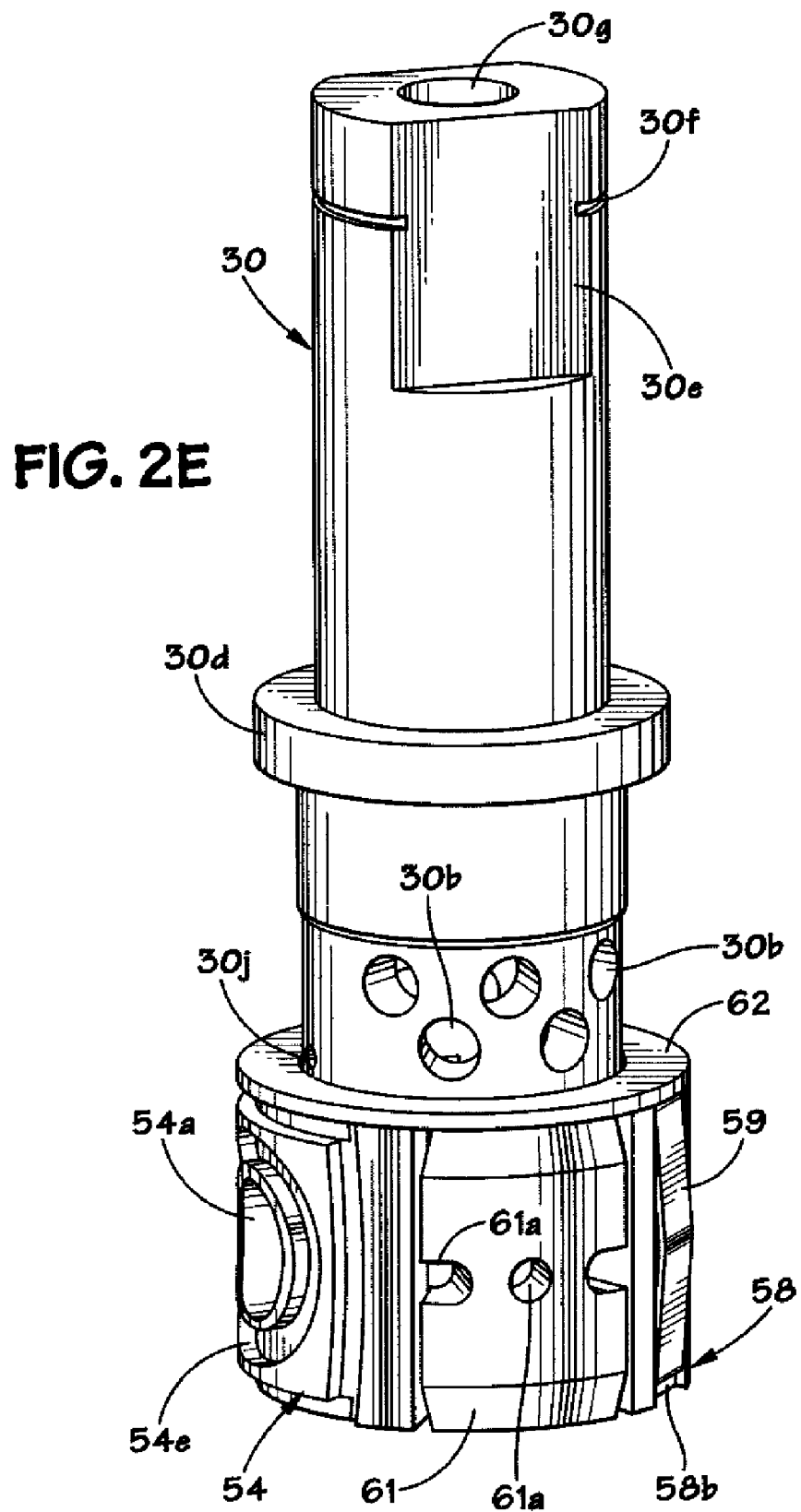

FIGS. 2C and 2D are, respectively, cross-sectional and perspective views of one illustrative embodiment of the choke cage 30 depicted above. The cage 30 comprises a body 30a, a plurality of openings 30b, a plurality of notches 30c, a flange 30d, a plurality of flats 30e, a groove 30f and an opening 30g. The notches 30c are adapted to operatively engage a plurality of pins 47 positioned in the plug 44 as shown in FIGS. 1A-1D. The size, number and location of the openings 30b may vary depending upon the particular application. The flats 30e are adapted to operatively engage the choke control bar 32. The outer groove 30f is adapted to receive a snap ring (not shown). The opening 30g is adapted to receive the stem 26. The stem 26 is operatively coupled to the choke cage 30 by a threaded connection generally designated with the reference number 40 (see FIG. 1A). An internal thread 30h (see FIG. 2C) is formed in the bore of the body 30a, while an external thread 26e (see FIG. 2F) is formed on the stem 26. An internal seal race 30i (see FIGS. 1A and 2C) is formed within the bore of the choke cage 30. The seal race 30i is adapted to receive the seal 42. A plurality of openings 30j are formed in the cage 30. The openings 30j are adapted to receive a pin 65 (see FIGS. 1A-1D), the purpose of which is to insure that the washer 62 remains in place. In FIG. 2E, the choke cage 30 is depicted with the segments 54, 58 and 61 positioned therearound. The washer 62 is positioned above the various components 54, 58 and 61. The segments 61 comprise a plurality of grease openings 61a for lubricating the components when necessary.

As shown in FIG. 2F, the stem 26 comprises a body 26a, a first end 26b, a second end 26c and an externally threaded portion 26d. The first end 26b of the stem 26 is adapted to be operatively coupled to the stem nut 28. The second end 26c of the stem 26 is adapted to slide within the lower portion of the choke cage 30 to thereby cover or expose the openings 30b. The second end 26c of the stem 26 may be considered to be a choke tip. Rotation of the stem 26 causes the stem 26 to travel linearly (by virtue of the threaded connection 40) such that the end 26c covers or exposes the openings 30b within the choke cage 30.

FIG. 2G is a cross-sectional view of one illustrative embodiment of the cage adapter 34. The cage adapter 34 comprises an inner bore 34a, an outer diameter 34b, an inner seal race 34c and an outer seal race 34d. The inner seal race 34c is adapted to receive the seal 38. The outer seal race 34d is adapted to receive the seal 36.

Figure 2H:
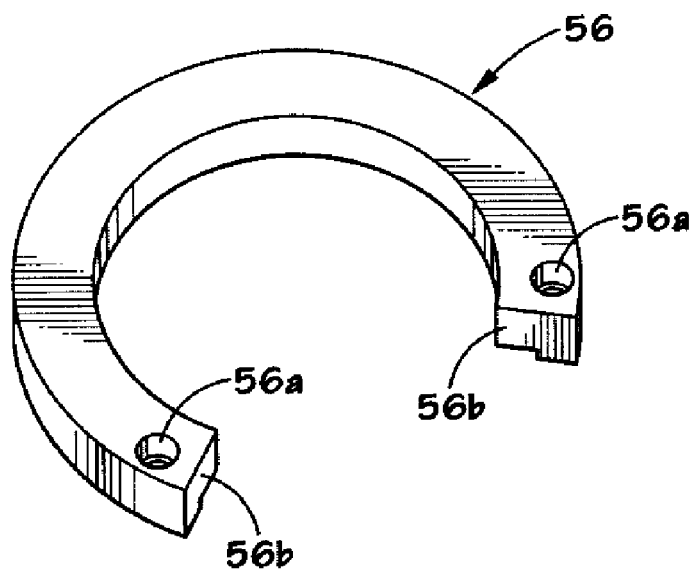

FIG. 2H depicts an illustrative ring-like stop 56. The ring-like stop 56 comprises a plurality of openings 56a, and it is removably coupled to the body 12 by a plurality of bolts (not shown) that extend through the openings 56a. The ring-like stop 56 is not a complete ring. The omitted portion is provided to allow rotation of the choke cage 30 as described more fully below.

Figure 2I:
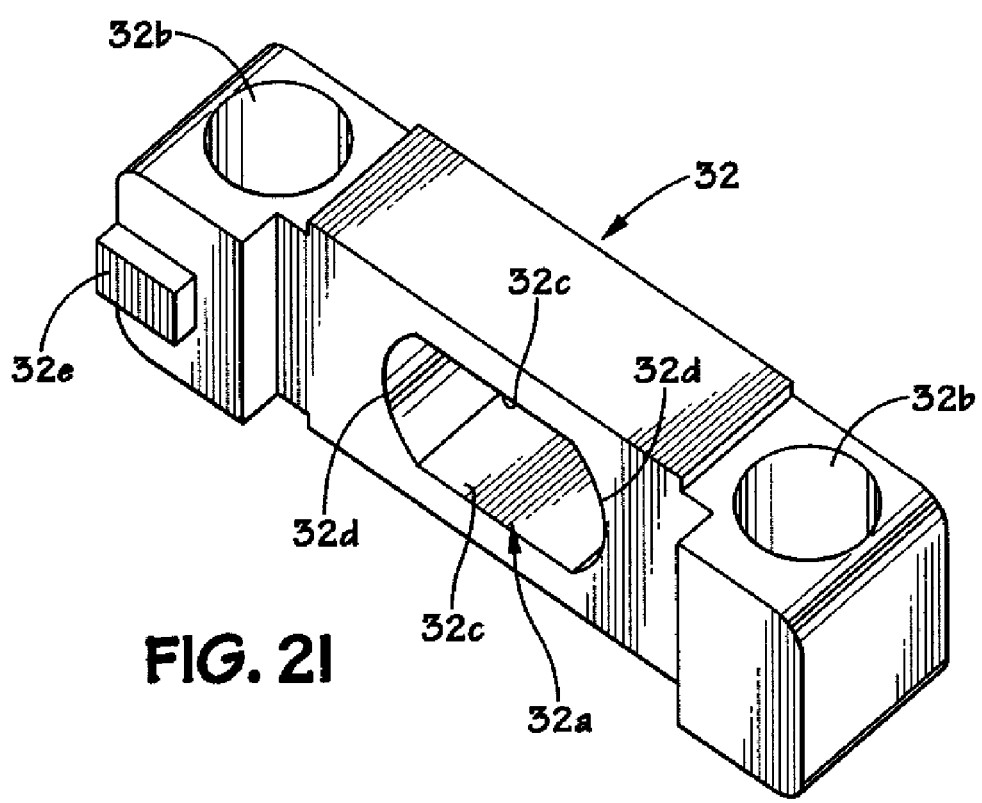
Figure 2N:
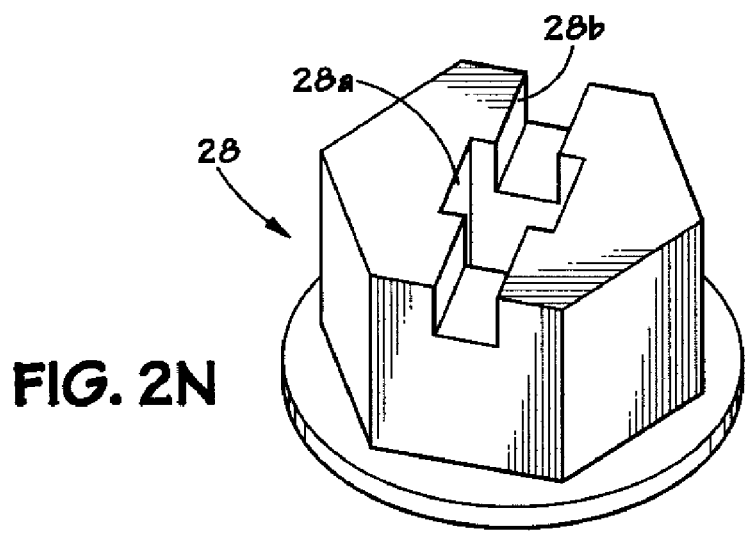

FIG. 2I is a perspective view of one illustrative embodiment of the choke control bar 32. The bar 32 comprises a central opening 32a and a plurality of through openings 32b. The central openings 32a comprise flat surfaces 32c and a plurality of rounded ends 32d. The flat surfaces 32c are adapted to engage the flat surface 30e on the choke cage 30. The choke control bar 32 further comprises a projection 32e extending from the bottom surface of the bar 32. The projection 32e is adapted to engage the end surfaces 56b (see FIG. 2G) of the ring-like stop 56 to thereby limit the rotation of the choke cage 30. A bar (not shown) may be positioned in one of the openings 32b to provide the desired leverage in cases where the choke control bar 32 is rotated manually.

FIGS. 2J and 2K are, respectively, a plan view and a cross-sectional view of one illustrative embodiment of the body cap 22. The body cap 22 comprises a first bore 22a and a second bore 22b. The body cap 22 also comprises an external thread 22c and an integrally formed nut 22d. The body cap 22 is adapted to be threadingly coupled to the body 12 by the threaded connection generally designated by the reference number 24 (see FIG. 1A). Internal threads are formed within the opening in the body 12. The opening 22a is adapted to have the choke cage 30 positioned therethrough.

FIGS. 2L and 2M are, respectively, a plan view and a cross-sectional view of one illustrative embodiment of a plug 44 that may be employed with the present valve 10. The plug 44 comprises a body 44a having a bore 44b extending through the body and an opening 44c that is, in this particular embodiment, oriented substantially transverse to the bore 44b. When the plug 44 is in the open position, see FIGS. 1B-1D, the opening 44c is substantially aligned with the opening 54a in the seal segment 54. A plurality of pins 47 that are adapted to engage the notches 30c in the choke cage 30 (see FIGS. 1B and 2C) are positioned in openings 44d in the plug body 44a.

FIG. 2N is a depiction of one illustrative embodiment of a stem nut 28 that may be employed with the present valve 10. The illustrative nut 28 comprises a rectangular shaped opening 28a and a slot 28b. The stem 28 is adapted to be operatively coupled to the first end 26b of the stem 26.

Figure 2O:
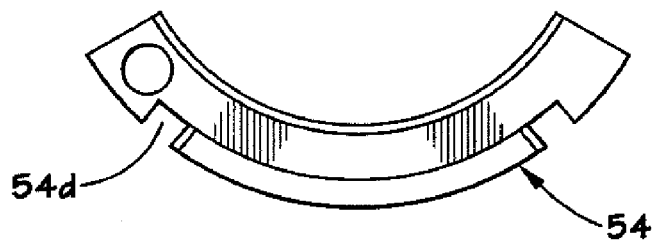
Figure 2P:
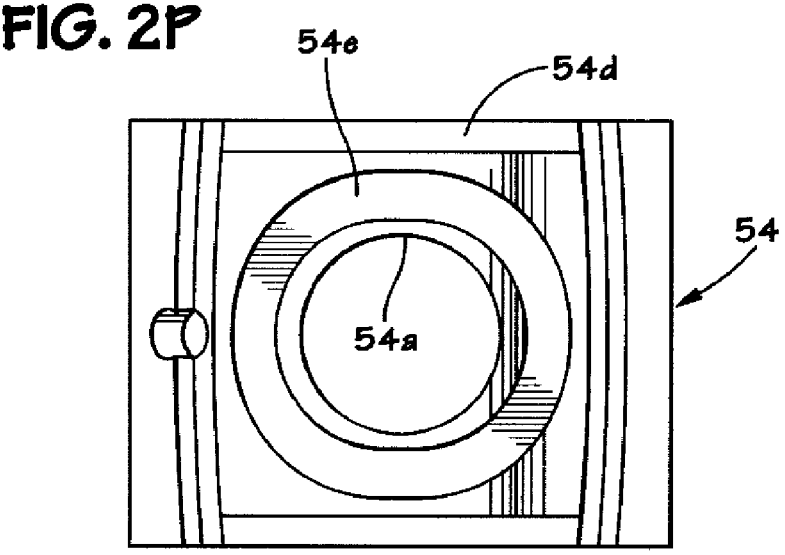
Figure 2R:
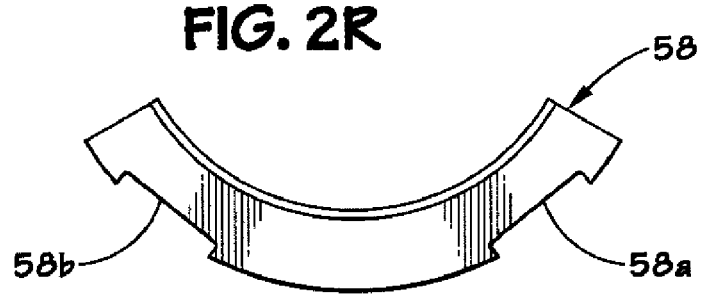
Figure 2Q:
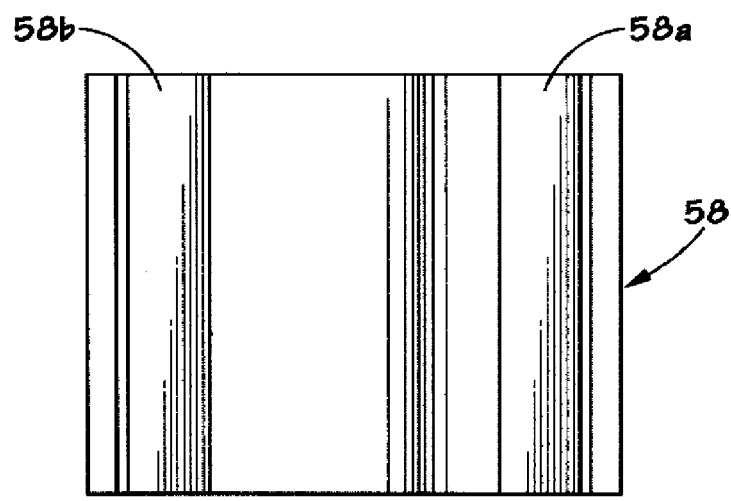
Figures 2S, 2T:
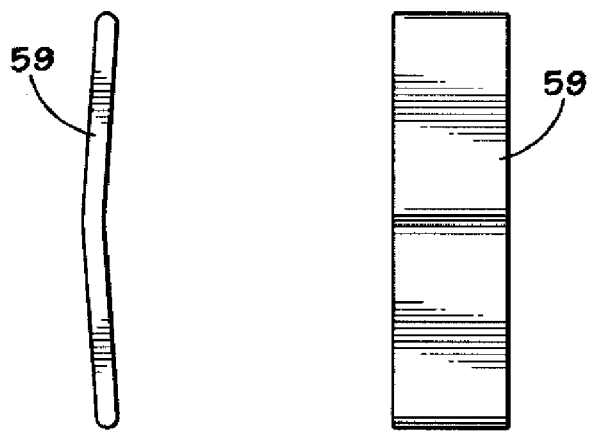

FIGS. 2O-2T depict various views of the segments 54 and 58 as well as the springs 59. As shown in FIGS. 2O and 2P, the seal segment 54 comprises seal races 54d and 54e that are adapted to receive seals 54c and 54b, respectively. FIGS. 2R and 2Q depict the slots 58a, 58b in the outer surface of the seal segment 58. The slots 58a, 58b are each adapted to receive a spring 59, like the illustrative spring depicted in FIGS. 2S and 2T. When the components 44, 54, 58 and 61 are positioned in the body 12, the spring 59 is energized by virtue of its engagement with the body 12. The energized springs 59 tend to bias or push the plug 44 and the sealing segment 54 toward the outlet 16 of the valve 16. This biasing tends to urge the seals 54b and 54c into sealing engagement with portions of the body 12.

One illustrative operational sequence of the valve 10 will now be described. As shown in FIG. 1A, the plug 44 is in the closed position, that is, the opening 44a is not aligned with the opening 54a in the front seal 54. Typically, the opening 44a may be oriented substantially transverse to the main flow path through the valve 10 when the plug 44 is in the closed position. Additionally, the end 26c of the stem 26 is in its lowermost extended position such that the end 26f,26c covers all of the openings 30b. In this lowermost position, the end 26c of the stem 26 is forcefully urged against the plug 44. In the position depicted in FIG. 1A, the plug 44 prevents the flow of fluid through the valve 10.

To begin operations, the plug 44 is rotated (e.g., approximately 90°) such that the opening 44a of the plug 44 is substantially aligned with the opening 54a in the seal element 54. In the depicted embodiment, this rotation is accomplished by rotating the choke control bar 32 counterclockwise approximately one quarter turn, as depicted in FIG. 1B. Rotation of the bar 32 causes rotation of the choke cage 30 which, in turn, causes counterclockwise rotation of the plug 44 to the position shown in FIG. 1B. The rotation of the choke cage 30 causes rotation of the plug 44 by virtue of the operatively coupling of the pins 47 in the plug 44 and the notches 30c in the choke cage 30. Note that in FIG. 1B the stem 26 is still in its fully extended position wherein the end 26c engages the plug 44 and the openings 30b in the choke cage 30 are still covered. In the position depicted in FIG. 1B, the valve 10 does not permit the flow of any substantial amounts of fluid through the valve 10, although relatively small amounts of fluid may pass through the valve 10.

To begin bleeding operations, the stem 26 is actuated, for example, by rotation, to retract the stem 26 from its fully extended position shown in FIG. 1B. The stem 26 moves linearly as it is rotated due to the threaded connection 40. After sufficient rotation and corresponding travel of the stem 26, the openings 30b start to become exposed, as reflected in FIG. 1C. Fluid may now flow through the valve 10 as depicted by the illustrative arrows 55. If desired, the rotation of the stem 26 may be continued until the stem 26 reaches its fully retracted or fully open position shown in FIG. 1D. At this extreme travel position, all of the openings 30b in the choke cage 30 are opened and maximum fluid flow may be achieved through the valve 10. In the depicted example, the illustrative stem 26 may be rotated by using a wrench to engage the stem nut 28.

As will be readily recognized by those skilled in the art, the valve disclosed herein prevents substantially all flow of fluid through the valve 10 when the plug 44 and the stem 26 are in their closed position, as shown in FIG. 1A. Additionally, variable positioning of the stem 26 within the choke cage 30 provides a wide range of operating positions where fluid flow is permitted through the valve 10. That is, the stem 26 may be positioned at a variety of settings such that the desired number of holes 30b may be partially or fully opened to thereby regulate the flow of fluid through the valve 10. As will be recognized by those skilled in the art after a complete reading of the present application, the actuation of the plug 44 is independent of the actuation of the choke, i.e., actuation of the stem 26 (which controls the flow of fluid through the valve 10). By providing independent control of the plug 44 and the choking actions, the valve 10 disclosed herein provides means of actuating and controlling various mechanisms that control the flow of fluid through the valve 10.

To close the valve 10, the process may essentially be reversed. The stem 26 may be actuated, e.g., rotated, until it reaches its fully closed position shown in FIG. 1B. Thereafter, the plug 44 may be actuated, e.g., rotated, from its fully open position shown in FIG. 1B to its fully closed position shown in FIG. 1A.

FIG. 3 depicts an alternative embodiment of the valve disclosed herein, wherein the plug 44 and the choke cage 30 are formed as one integral body, i.e., they are not separate components. That is, the choke cage 30 has a lower plug portion that acts to prevent or allow flow of a fluid through the valve 10 depending upon the operational position of the lower plug portion of the choke cage 30. Of course, in the depicted embodiment, rotation of the choke cage 30 controls the operational position, e.g., opened or closed, of the lower plug portion. The alternative embodiment of the valve 10 depicted in FIG. 3 may be operated in the same manner as that described previously with respect to FIGS. 1A-1D.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An adjustable valve, comprising:
    a valve body having a fluid inlet and a fluid outlet;
    a rotatable plug body positioned within said valve body, said plug body having at least one flow path defined therein;
    a rotatable choke cage positioned proximate said plug body, said choke cage comprising a plurality of openings to permit a flow of a fluid therethrough, said choke cage adapted to be used to regulate the flow of fluid from said fluid inlet of said valve body, through at least one of said plurality of openings in said choke cage, through the flow path in the plug body, and out said fluid outlet of said valve body; and
    an actuatable member positioned within a portion of the choke cage, said actuatable member adapted to cover or expose said plurality of openings in the choke cage to regulate a flow of fluid through the choke cage to the flow path in the plug body and out said fluid outlet of said valve body.

2. The adjustable valve of claim 1, wherein said choke cage is operatively coupled to said plug body such that actuation of the choke cage controls an operational position of the plug body.

3. The adjustable valve of claim 2, wherein rotation of the choke cage controls the operational position of the plug body.

4. The adjustable valve of claim 1, wherein the choke cage and said actuatable member are independently actuatable relative to one another.

5. The adjustable valve of claim 1, wherein said actuatable member is actuatable independently of actuating the choke cage.

6. The adjustable valve of claim 1, wherein the actuatable member is a rotatable valve stem.

7. The adjustable valve of claim 6, further comprising a threaded interconnection between a portion of the stem and a portion of the choke cage.

8. The adjustable valve of claim 2, wherein, in one operational position of said plug body, a flow of fluid through the valve is substantially prevented.

9. The adjustable valve of claim 8, wherein, in another operational position of said plug body, the flow path in said plug body is substantially aligned with said fluid outlet of said valve body.

10. The adjustable valve of claim 1, wherein said plug body and said actuatable member are each actuatable to a plurality of operational positions, and wherein the actuation of said plug body is independent of the actuation of said actuatable member.

11. The adjustable valve of claim 1, wherein said plug body and said choke cage are separate components.

12. An adjustable valve, comprising:
a valve body having a fluid inlet and a fluid outlet;
a rotatable plug body positioned within said valve body, said plug body having at least one flow path defined therein;
a rotatable choke cage positioned proximate said plug body, said choke cage comprising a plurality of openings to permit a flow of a fluid therethrough, said choke cage adapted to be used to regulate the flow of fluid from said fluid inlet of said valve body, through at least one of said plurality of openings in said choke cage, through the flow path in the plug body, and out said fluid outlet of said valve body and wherein said choke cage is operatively coupled to said plug body such that rotation of the choke cage controls an operational position of the plug body; and
an actuatable member positioned within a portion of the choke cage, said actuatable member adapted to cover or expose said plurality of openings in the choke cage to regulate a flow of fluid through the choke cage and the plug body.

13. The adjustable valve of claim 12, wherein, in one operational position of said plug body, a flow of fluid through the valve is substantially prevented.

14. The adjustable valve of claim 13, wherein, in another operational position of said plug body, the flow path in said plug body is substantially aligned with said fluid outlet of said valve body.

15. The adjustable valve of claim 12, wherein the choke cage and said actuatable member are independently actuatable relative to one another.

16. The adjustable valve of claim 12, wherein the actuatable member is a rotatable valve stem.

17. The adjustable valve of claim 16, further comprising a threaded interconnection between a portion of the stem and a portion of the choke cage.

18. The adjustable valve of claim 12, wherein said choke cage is operatively coupled to said plug body by a plurality of pins.

19. The adjustable valve of claim 12, wherein said plug body and said actuatable member are each actuatable to a plurality of operational positions, and wherein the actuation of said plug body is independent of the actuation of said actuatable member.

20. An adjustable valve, comprising:
a valve body having a fluid inlet and a fluid outlet;
a rotatable plug body having at least one flow path defined therein;
a rotatable choke cage operatively coupled to said plug body, said choke cage adapted to be used to regulate the flow of fluid from said fluid inlet of said valve body, through said choke cage, through the flow path in the plug body, and out said fluid outlet of said valve body, wherein rotation of the choke cage controls the operational position of the plug body; and
an actuatable member positioned within a portion of the choke cage, said actuatable member adapted to cover or expose said plurality of openings in the choke cage to regulate a flow of fluid through the choke cage and the plug body.

21. The adjustable valve of claim 20, wherein, in one operational position of said plug body, a flow of fluid through the valve is substantially prevented.

22. The adjustable valve of claim 21, wherein, in another operational position of said plug body, the flow path in said plug body is substantially aligned with said fluid outlet of said valve body.

23. The adjustable valve of claim 20, wherein said plug body and said actuatable member are each actuatable to a plurality of operational positions, and wherein the actuation of said plug body is independent of the actuation of said actuatable member.

24. The adjustable valve of claim 20, wherein said choke cage is operatively coupled to said plug body by a plurality of pins.

25. An adjustable valve, comprising:
a valve body having a fluid inlet and a fluid outlet;
a rotatable plug body positioned within the valve body, the plug body having at least one flow path defined therein;
a choke comprising a rotatable choke cage, wherein rotation of the choke cage controls an operational position of the plug body, wherein said plug body and said choke are each actuatable to a plurality of operational positions, and wherein the actuation of said plug body is independent of the actuation of said choke; and
an actuatable member positioned within a portion of the choke cage, said actuatable member adapted to cover or expose a plurality of openings in the choke cage to regulate the flow of fluid through the choke cage and the at least one flow path in the plug body.

26. An adjustable valve, comprising:
a valve body having a fluid inlet and a fluid outlet;
a rotatable plug body positioned within said valve body, said rotatable plug body having at least one flow path defined therein;
a rotatable choke cage operatively coupled to said rotatable plug body such that rotation of the choke cage causes rotation of the plug body; and a rotatable member positioned within a portion of the choke cage, said rotatable member adapted to, when rotated, travel within the choke cage so as to cover or expose a plurality of openings in the choke cage to regulate a flow of fluid from said fluid inlet of said valve body, through the choke cage, through the flow path in the plug body, and out said fluid outlet of said valve body.

27. The adjustable valve of claim 26, wherein rotation of the choke cage controls the operational position of the plug body.

28. The adjustable valve of claim 26, wherein said rotatable choke cage and said rotatable member are rotatable independently of one another.

29. The adjustable valve of claim 26, wherein said rotatable member is a portion of a valve stem.

30. An adjustable valve, comprising:
   a valve body having a fluid inlet and a fluid outlet;
   a rotatable choke cage positioned at least partially in said valve body, said choke cage comprising a plurality of openings to permit a flow of a fluid therethrough and a plug portion with a flow path defined therein, said plug portion adapted to, when closed, block a flow of fluid between said fluid inlet and said fluid outlet, said choke cage adapted to be used to regulate the flow of fluid from said fluid inlet of said valve body, through the flow path in the plug portion of the choke cage, and out said fluid outlet of said valve body; and
   an actuatable member positioned within a portion of the choke cage, said actuatable member adapted to cover or expose said plurality of openings in the choke cage to regulate a flow of fluid through the openings in the choke cage and the flow path in the plug portion of the choke cage.

31. The adjustable valve of claim 30, wherein rotation of the choke cage controls the operational position of the plug portion of the choke cage.

32. The adjustable valve of claim 30, wherein the choke cage and said actuatable member are independently actuatable relative to one another.

33. The adjustable valve of claim 30, wherein the actuatable member is a rotatable valve stem.

34. The adjustable valve of claim 33, further comprising a threaded interconnection between a portion of the stem and a portion of the choke cage.

35. The adjustable valve of claim 30, wherein, in one operational position of said plug portion, the flow path in said plug portion is substantially aligned with said fluid outlet of said valve body.

36. An adjustable valve, comprising:
   a valve body having a fluid inlet and a fluid outlet;
   a rotatable choke cage positioned at least partially in said valve body, said choke cage comprising a plurality of openings to permit a flow of a fluid therethrough and a plug portion with a flow path defined therein, said plug portion adapted to, when closed, block a flow of fluid between said inlet and said outlet, and, when opened, allow a flow of fluid between from said fluid inlet of said valve body, through at least one of said plurality of openings in said choke cage, through the flow path in the plug body, and out said fluid outlet of said valve body, wherein actuation of the choke cage controls the operational position of the plug portion of the choke cage; and
   an actuatable member positioned within a portion of the choke cage, said actuatable member adapted to cover or expose said plurality of openings in the choke cage to regulate a flow of fluid through the openings in the choke cage and the flow path in the plug portion of the choke cage.

37. The adjustable valve of claim 36, wherein rotation of the choke cage controls the operational position of the plug portion of the choke cage.

38. The adjustable valve of claim 36, wherein the choke cage and said actuatable member are independently actuatable relative to one another.

39. The adjustable valve of claim 38, wherein the actuatable member is a rotatable valve stem.

40. The adjustable valve of claim 39, further comprising a threaded interconnection between a portion of the stem and a portion of the choke cage.

41. The adjustable valve of claim 36, wherein, in one operational position of said plug portion, the flow path in said plug portion is substantially aligned with an outlet of said valve.

* * * * *